Patented July 28, 1931

1,815,903

UNITED STATES PATENT OFFICE

LEON W. GELLER, OF HAMBURG, NEW YORK, ASSIGNOR TO NATIONAL ANILINE & CHEMICAL CO., INC., OF NEW YORK, N. Y., A CORPORATION OF NEW YORK

PROCESS OF ELIMINATING EXCESS DIAZO COMPOUNDS

No Drawing.    Application filed December 23, 1925. Serial No. 77,371.

This invention relates to a process of eliminating diazo compounds, particularly when present as an undesirable component in the manufacture and production of azo coloring matters or when present in admixture with other bodies.

In the manufacture of azo coloring matters by coupling a diazo compound with an azo or polyazo dye component, it is often advantageous to use an excess of the diazo compound in order to bring about a more complete reaction or to shorten the time required to complete the combination. Further, the mistake of adding an excess of diazo compound over that required to complete the reaction sometimes occurs. It is well-known that the presence of an excess of a diazo compound at the completion of the combination is often detrimental toward isolating or securing a desirable final product, particularly if the product produced at this stage is to be further coupled into other additional components.

According to the present invention, it has been found that diazo compounds in solution, or in admixture with other bodies, more particularly azo bodies, can be eliminated by decomposition, with formation of other bodies which are not diazo compounds, by treating them in alkaline, neutral or acid media with a hydrazine compound, particularly an arylhydrazine derivative, and more especially a soluble phenylhydrazine derivative, such as phenylhydrazine-sulfonic acid, etc. It has been found further that different diazo bodies are decomposed at different rates when treated with a phenylhydrazine derivative, and consequently under suitable conditions one or more diazo bodies may be substantially eliminated from admixtures or solutions containing several diazo bodies without effecting the complete decomposition of all of them.

The following specific example will further illustrate the invention, but it will be understood that the invention is not limited thereto.

Example: To the well-stirred alkaline solution, at a temperature of about 0° C., which contains in suspension the diazo-disazo intermediate body which in the free state is diazobenzidine-azo-1,8-aminonaphthol - 3,6 - disulfonic acid-azobenzene and which corresponds with the following probable formula:

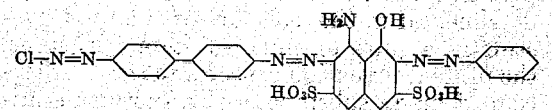

and which has been produced in the well-known manner by first coupling 1,8-aminonaphthol-3,6-disulfonic acid (one mol) in acid solution with tetrazotized benzidine (one mol) and then with diazobenzene in alkaline solution (an excess of one mol of diazobenzene being employed in carrying out the second coupling), there is slowly added a cold, dilute (one to five percent) alkaline solution of phenylhydrazine-p-sulfonic acid until a sample of the reaction mixture when tested with R-salt shows the absence of diazobenzene. Under these conditions the excess diazobenzene is quickly destroyed while the diazo group attached to the benzidine nucleus is comparatively little, if any, acted upon. The solution containing the diazo-disazo body being free from diazobenzene may now be advantageously used for the production of trisazo coloring matters by coupling it into any suitable azo dye component, such as, for example, meta-phenylene-diamine or metatoluylenediamine. The absence of diazobenzene avoids or minimizes the production of undesirable coloring matters such as might be otherwise produced by its action on the azo dye component, e. g., m-phenylenediamine, and thereby permits the production of dyestuffs substantially free from such impurities. The products formed as a result of the decomposition of the diazo benzene being mainly soluble and relatively inert to the m-phenylenediamine have substantially no deleterious effect upon the final coupling step and the resulting dyestuff obtained.

In the above example, it will be noted that the soluble diazo compound, i. e., diazobenzene, is readily decomposed by interaction with the hydrazine compound while the relatively insoluble diazo-disazo body, to wit., diazobenzidine-azo-1,8-aminonaphthol - 3,6-disulfonic acid-azo-benzene, is decomposed only to a small extent. The different rates at which the diazo compound and the diazo-disazo compound are decomposed by the action of the hydrazine compound is due, in part at least, to the solubility of the former and to the relative insolubility of the latter. By prolonged treatment with a hydrazine compound, all diazo bodies, in general, both soluble and insoluble are ultimately decomposed.

In a similar manner, the same or other diazo components may be eliminated in the manufacture of other azo coloring matters. The process is particularly advantageous in the elimination of excess diazo bodies when only one diazo group or diazotised body is present, particularly at the completion of the final or last coupling, and especially if the presence of the excess diazo compound is detrimental to the isolation of the final dyestuff in a pure or purified state. Further, the present invention is useful in the purification of many substances which are contaminated with amino bodies by diazotising the amino body and then destroying the same by means of a suitable hydrazine body in acid, neutral or alkaline solution.

I claim:

1. In the production of an azo dyestuff, the improvement which comprises treating with phenylhydrazine-p-sulfonic acid and alkaline reaction mixture containing diazobenzene and diazo benzidine-azo-1.8-aminonaphthol-3.6-disulfonic acid-azo-benzene and resulting from the coupling of diazobenzidine-azo-1.8-aminonaphthol-3.6-disulfonic acid with an excess of diazobenzene in an alkaline medium, whereby the diazobenzene is decomposed.

2. In the production of an azobenzidine-azo-1.8-aminonaphthol-3.6-disulfonic acid-azobenzene, the improvement which comprises treating with a soluble aryl hydrazine a reaction mixture containing diazobenzene and diazobenzidine-azo-1.8-aminonaphthol-3.6-disulfonic acid-azo-benzene and resulting from the coupling of diazobenzidine-azo-1.8-aminonaphthol-3.6-disulfonic acid with an excess of diazobenzene, whereby the diazobenzene is decomposed, and coupling the diazobenzidine-azo-1.8-aminonaphthol-3.6-disulfonic acid-azobenzene with an azo dye coupling component.

3. In the production of m-phenylenediamine-azobenzidine-azo-1.8-aminonaphthol-3.6-disulfonic acid-azobenzene, the improvement which comprises treating with a phenylhydrazine sulfonic acid an alkaline reaction mixture containing diazobenzene and diazobenzidine-azo-1.8-aminonaphthol-3.6-disulfonic acid-azo-benzene and resulting from the coupling of diazobenzidine-azo-1.8-aminonaphthol-3.6-disulfonic acid with an excess of diazobenzene in an alkaline medium, whereby the diazobenzene is decomposed, and coupling the diazobenzidine-azo-1.8-aminonaphthol-3.6-disulfonic acid-azobenzene with m-phenylenediamine.

4. In the production of m-phenylenediamine-azo-benzidine-azo-1.8-aminonaphthol-3.6-disulfonic acid-azobenzene, the improvement which comprises treating with phenylhydrazine-p-sulfonic acid an alkaline reaction mixture containing diazobenzene and diazobenzidine-azo-1.8-aminonaphthol-3.6-disulfonic acid-azo-benzene and resulting from the coupling of diazobenzidine-azo-1.8-aminonaphthol-3.6-disulfonic acid with an excess of diazobenzene in an alkaline medium, whereby the diazobenzene is decomposed, and coupling the diazobenzidine-azo-1.8-aminonaphthol-3.6-disulfonic acid-azobenzene with m-phenylenediamine.

5. In the production of an azo coloring matter by combining an azo dye component with diazo compound, and wherein at the completion of the combination the resultant reaction mixture contains a portion of said diazo compound in the uncombined state, the process which comprises subjecting said resultant reaction mixture to the action of a hydrazine body until said uncombined diazo compound is decomposed.

6. In the production of an azo coloring matter by combining an azo dye component with a diazo compound, and wherein at the completion of the combination the resultant reaction mixture contains a portion of said diazo compound in the uncombined state, the process which comprises subjecting said resultant reaction mixture to the action of a soluble arylhydrazine body in the presence of an alkaline medium until said uncombined diazo compound is decomposed.

7. In the production of an azo coloring matter by combining an azo dye component with a diazo compound, and wherein at the completion of the combination the resultant reaction mixture contains a portion of said diazo compound in the uncombined state, the process which comprises subjecting said resultant reaction mixture to the action of a soluble phenylhydrazine sulfonic acid in the presence of an alkaline medium until said uncombined diazo compound is decomposed.

8. A process which comprises subjecting a mixture containing a soluble diazo compound and an insoluble diazo-disazo compound to the action of a soluble arylhydrazineسulfonic acid in the presence of an alkaline medium until said soluble diazo compound is substantially decomposed.

In testimony whereof I affix my signature.

LEON W. GELLER.

CERTIFICATE OF CORRECTION.

Patent No. 1,815,903.  Granted July 28, 1931, to

LEON W. GELLER.

It is hereby certified that error appears in the printed specification of the above numbered patent requiring correction as follows: Page 2, line 31, claim 1, for "and" read an; line 86, claim 5, before "diazo" insert the article "a"; and that the said Letters Patent should be read with these corrections therein that the same may conform to the record of the case in the Patent Office.

Signed and sealed this 1st day of September, A. D. 1931.

(Seal)

M. J. Moore,
Acting Commissioner of Patents.